W. S. HOLLAND & J. W. PARKER.
Slides for Extension-Tables.
No. 166,204. Patented Aug. 3, 1875.
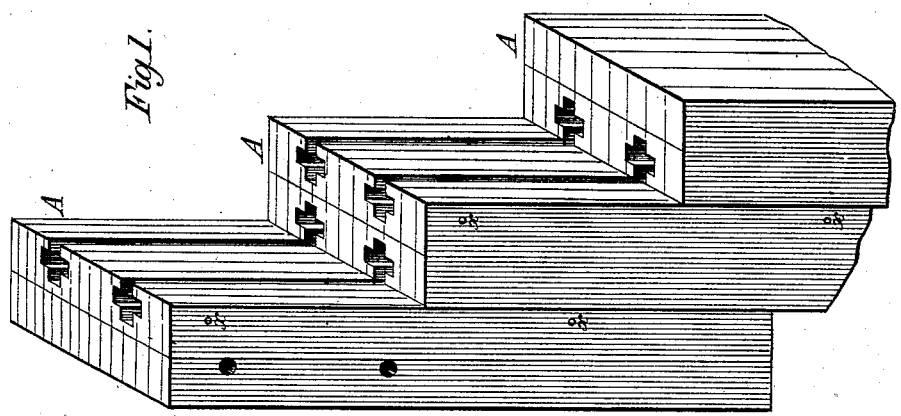
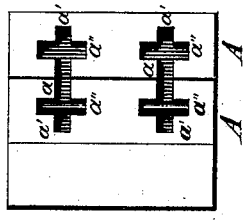
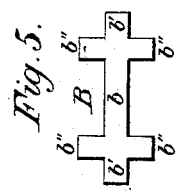
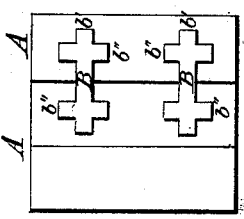
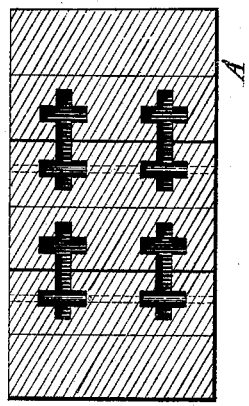

UNITED STATES PATENT OFFICE.

WALLACE S. HOLLAND AND JOSIAH W. PARKER, OF VERGENNES, VERMONT.

IMPROVEMENT IN SLIDES FOR EXTENSION-TABLES.

Specification forming part of Letters Patent No. 166,204, dated August 3, 1875; application filed June 7, 1875.

*To all whom it may concern:*

Be it known that we, WALLACE S. HOLLAND and JOSIAH W. PARKER, of Vergennes, in the county of Addison, in the State of Vermont, have made certain Improvements in Slides for Extension-Tables, of which the following is a specification:

The object of this invention is to produce a slide that has a greater length of leverage and a more perfect guide in the runner-bars than is had by the usual construction; and it consists in the construction of the slide and the grooves in the runner-bars, as will be fully hereinafter described.

In the drawings, Figure 1 represents a perspective of the runner-bars extended, and the grooves therein that receive the slides; Fig. 2, an end view of same; Fig. 3, an end view of two runner-bars with their grooves; Fig. 4, the same with slides in the grooves, and Fig. 5 an enlarged end view of the metallic slide.

A represents the extension runner-bars, having grooves in their sides to receive the metallic slides. The grooves $a$ are formed in the runner-bars at right angles to their faces, and terminate at $a'$ in each of the runner-bars, and midway, or about midway, of their depth are grooves $a''$, at right angles with and extending from each side of groove $a$, to have the metal slides to take their hold in the runner-bars A. B is the metal slide, in the form of a double cross, as seen in Fig. 5, having the body $b$ terminating in ends $b'$ $b'$, and having the right-angled projections $b''$ $b''$ at a proper distance from each end $b'$. These metallic slides are inserted in the grooves $a$ in the runner-bars A, in the usual manner, so that the runner-bars can be extended or drawn out, as seen in Fig. 1, and have the usual stops $x$ to stop against in the extent of their reciprocations in either direction.

This construction of slides and their grooves in the runner-bars to receive them and allow reciprocation of the runner-bars upon each other affords a greater amount of leverage to resist the tendency of the runner-bars, by their weight, to sag or fall, and thereby cause friction and make the runner-bars hard to operate, all of which is due to the extension of the ends $b'$ of the metallic slides beyond the right-angled transverse projections $b''$ $b''$, which take into and slide in the extended groove $a'$ of the grooves $a$ in the runner-bars, beyond the right-angled projections $a''$ in the grooves, which receive the projections $b''$ of the slide, and thereby prevent the strain upon the upright sides of the projections $b''$, as is ordinarily the case where the groove has no extensions $a'$, or the slide no extension $b'$.

What we claim, and desire to secure by Letters Patent, is—

1. The metallic slide B, having the extensions $b'$ beyond the right-angled projections $b''$ $b''$ of body $b$, in the manner and for the purpose substantially as described.

2. The runner-bars A, having the grooves $a$ formed with the extensions $a'$ beyond the upright and right-angled grooves $a''$, in the manner and for the purpose substantially as described.

3. The combination, in extension-tables, of the metal slides B, having the extension ends $b'$, with the runner-bars A, having the grooves $a$ and the terminal grooves $a'$, to receive the metal slides, in the manner substantially as specified.

WALLACE S. HOLLAND.
JOSIAH W. PARKER.

Witnesses:
H. M. SMITH,
EMERSON HOLLAND.